United States Patent
Tsai et al.

(10) Patent No.: US 12,073,020 B2
(45) Date of Patent: Aug. 27, 2024

(54) HEAD-MOUNTED DISPLAY, UNLOCKING METHOD AND NON-TRANSITORY COMPUTER READABLE STORAGE MEDIUM THEREOF

(71) Applicant: HTC Corporation, Taoyuan (TW)

(72) Inventors: Meng-Chi Tsai, Taoyuan (TW); Cheng-Han Hsieh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/148,435

(22) Filed: Dec. 30, 2022

(65) Prior Publication Data
US 2024/0220015 A1 Jul. 4, 2024

(51) Int. Cl.
*G06F 3/01* (2006.01)
*G06F 3/0346* (2013.01)
*G06T 7/70* (2017.01)

(52) U.S. Cl.
CPC .............. *G06F 3/014* (2013.01); *G06F 3/017* (2013.01); *G06F 3/0346* (2013.01); *G06T 7/70* (2017.01); *G06F 2203/0331* (2013.01); *G06T 2207/30196* (2013.01)

(58) Field of Classification Search
CPC ........ G06F 3/014; G06F 3/017; G06F 3/0346; G06F 2203/0331; G06T 7/70; G06T 2207/30196
See application file for complete search history.

(56) References Cited

U.S. PATENT DOCUMENTS

| | | | | |
|---|---|---|---|---|
| 7,327,858 B2 * | 2/2008 | Weiss | .................... | G06F 18/254 235/462.43 |
| 11,747,901 B1 * | 9/2023 | Keller | ..................... | G06F 3/016 345/156 |
| 2014/0071041 A1 * | 3/2014 | Fujimaki | ................. | G06F 3/017 345/156 |
| 2015/0065053 A1 * | 3/2015 | Cho | ........................ | H04W 4/80 455/41.2 |
| 2015/0286813 A1 * | 10/2015 | Jakobsson | .............. | A61B 5/681 726/9 |
| 2015/0362997 A1 * | 12/2015 | Hatton | .................... | G06F 3/014 701/2 |

(Continued)

FOREIGN PATENT DOCUMENTS

| | | |
|---|---|---|
| CN | 104007817 A | 8/2014 |
| CN | 104571849 A | 4/2015 |

(Continued)

OTHER PUBLICATIONS

The office action of the corresponding Taiwanese application No. TW112114243 issued on May 24, 2024.

*Primary Examiner* — Grant Sitta
(74) *Attorney, Agent, or Firm* — CKC & Partners Co., LLC

(57) ABSTRACT

A head-mounted display, unlocking method, and non-transitory computer readable storage medium thereof are provided. The head-mounted display generates a wearing position distribution based on a plurality of real-time images including a user wearing at least one wearable device on at least one finger position, wherein the wearing position distribution indicates a wearing position of the at least one wearable device wear worn by the user. The head-mounted display generates an unlocking signal to unlock the head-mounted display based on the wearing position distribution.

16 Claims, 5 Drawing Sheets

(56) References Cited

U.S. PATENT DOCUMENTS

| | | | | |
|---|---|---|---|---|
| 2017/0303093 A1* | 10/2017 | Tanabe | .................... | G06F 3/017 |
| 2018/0211020 A1* | 7/2018 | Fukuda | .................. | A61B 5/117 |
| 2018/0224944 A1* | 8/2018 | Vijayaraghavan | ...... | G06F 3/017 |
| 2019/0094981 A1 | 3/2019 | Bradski et al. | | |
| 2020/0133395 A1* | 4/2020 | Kaneko | ................. | G06F 3/0346 |
| 2020/0319713 A1* | 10/2020 | Huffman | ............... | G01S 13/867 |
| 2022/0172505 A1* | 6/2022 | Bergqvist | ............... | G06V 40/60 |

FOREIGN PATENT DOCUMENTS

| | | | |
|---|---|---|---|
| CN | 105518576 A | 4/2016 | |
| CN | 105899996 A | 8/2016 | |
| CN | 106557672 A | 4/2017 | |
| CN | 113272766 A | 8/2021 | |
| JP | 6099348 B2 | 3/2017 | |
| TW | 202016696 A | 5/2020 | |

* cited by examiner

HEAD-MOUNTED DISPLAY, UNLOCKING METHOD AND NON-TRANSITORY COMPUTER READABLE STORAGE MEDIUM THEREOF

BACKGROUND

Field of Invention

The present invention relates to a head-mounted display, unlocking method, and non-transitory computer readable storage medium thereof. More particularly, the present invention relates to a head-mounted display, unlocking method, and non-transitory computer readable storage medium thereof for efficiently unlocking the head-mounted display.

Description of Related Art

In recent years, various technologies related to virtual reality have developed rapidly, and various technologies and applications of head-mounted displays have been proposed one after another.

In the prior art, when the user wears the head-mounted display, the user can draw an unlocking pattern through the handheld controller to perform the unlocking operation of the head-mounted display.

However, in such a situation, since the user needs to additionally operate the handheld controller to draw a corresponding unlocking pattern, it is usually difficult for the user to quickly complete the unlocking operation. In addition, when the preset unlocking pattern of the head-mounted display is too complicated, it may happen that the user makes a mistake in drawing the unlocking pattern, resulting in unlocking failure. Therefore, the user needs to operate many times, causing inconvenience for the user.

Accordingly, there is an urgent need for an unlocking technology that can efficiently provide a user with the ability to unlock the head-mounted display and does not require the user to hold the controller.

SUMMARY

An objective of the present disclosure is to provide a head-mounted display. The head-mounted display comprises an image capturing device and a processor, and the processor is coupled to the image capturing device. The image capturing device is configured to capture a plurality of real-time images including at least one wearable device worn on at least one finger position of a user. The processor generates a wearing position distribution based on the real-time images, wherein the wearing position distribution indicates a wearing position of the at least one wearable device worn by the user. The processor generates an unlocking signal to unlock the head-mounted display based on the wearing position distribution.

Another objective of the present disclosure is to provide an unlocking method, which is adapted for use in an electronic apparatus. The unlocking method comprises the following steps: determining a plurality of finger joint positions of a user based on a plurality of real-time images including at least one wearable device worn on at least one finger position of the user; generating a wearing position distribution of the at least one wearable device based on the finger joint positions, wherein the wearing position distribution indicates a wearing position of the at least one wearable device worn by the user; and generating an unlocking signal to unlock a head-mounted display based on the wearing position distribution.

A further objective of the present disclosure is to provide a non-transitory computer readable storage medium having a computer program stored therein. The computer program comprises a plurality of codes, the computer program executes an unlocking method after being loaded into an electronic apparatus. The unlocking method comprises the following steps: determining a plurality of finger joint positions of a user based on a plurality of real-time images including at least one wearable device worn on at least one finger position of the user; generating a wearing position distribution of the at least one wearable device based on the finger joint positions, wherein the wearing position distribution indicates a wearing position of the at least one wearable device worn by the user; and generating an unlocking signal to unlock a head-mounted display based on the wearing position distribution.

According to the above descriptions, the unlocking technology (at least including the head-mounted display, the method, and the non-transitory computer readable storage medium) provided by the present disclosure by analyzing a plurality of real-time images corresponding to the at least one finger position of the user to generate a wearing position distribution. Next, the present disclosure can generate an unlock signal to unlock the head-mounted display based on the wearing position distribution. Since the present disclosure only requires the cooperation of the wearable device and the head-mounted display, the user does not need to hold the controller or operate physical buttons on the controller, and does not need to draw complicated unlocking patterns. Therefore, the unlocking technology provided by the present disclosure can improve the efficiency of unlocking the head-mounted display when the user wears the head-mounted display.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a head-mounted display, unlocking method, and non-transitory computer readable storage medium thereof according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
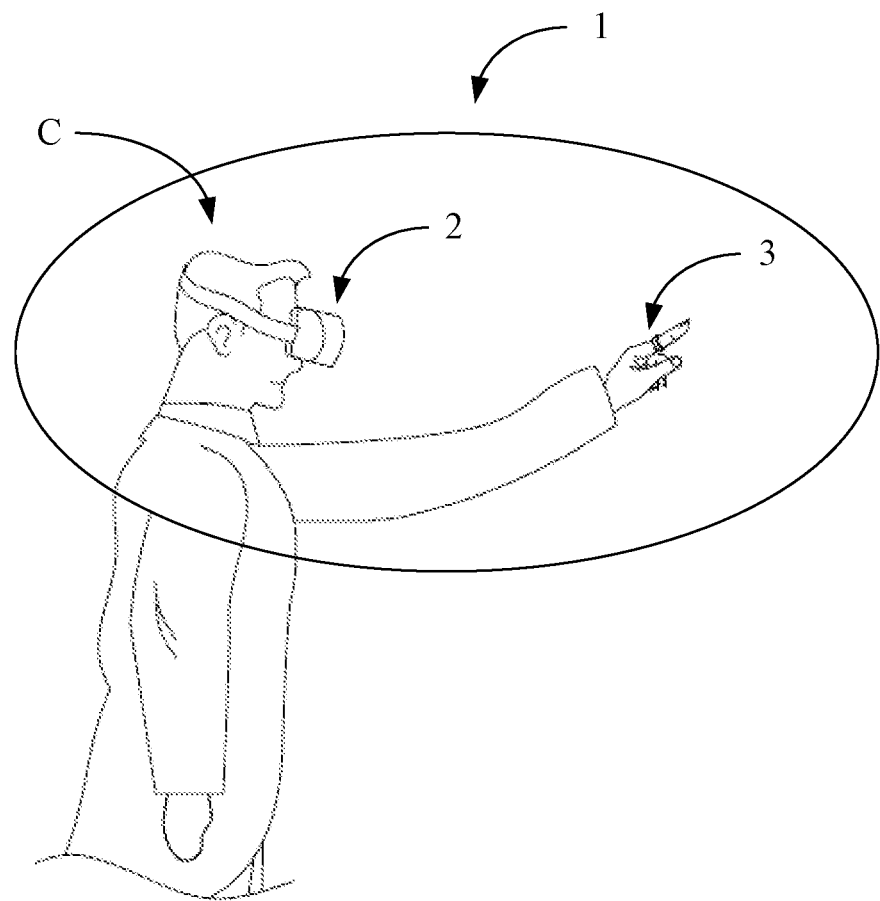
FIG. 1 is a schematic diagram depicting the applicable scene of the unlocking signal generating system of the first embodiment.

First, the applicable scene of the present embodiment will be described, and a schematic diagram of which is depicted in FIG. 1. As shown in FIG. 1, in the application environment of the present disclosure, a user C may use a head-mounted display 2, and the user C may wear at least one wearable device 3 on a body part (e.g., the user C wears a smart ring on the index finger of the left hand) to perform control operations and unlocking operations (e.g., applications) corresponding to the head-mounted display 2.

It shall be appreciated that this disclosure does not limit the number of the wearable device 3 used by the user C, and those of ordinary skilled in the art should be able to understand the implementations when the user C wears a plurality of wearable devices based on the descriptions of the present disclosure, so no further description will be made herein.

In the first embodiment of the present disclosure, the unlocking signal generating system 1 comprises a head-mounted display 2 and at least one wearable device 3, and the head-mounted display 2 is communicatively connected to the at least one wearable device 3.

Figure 2:
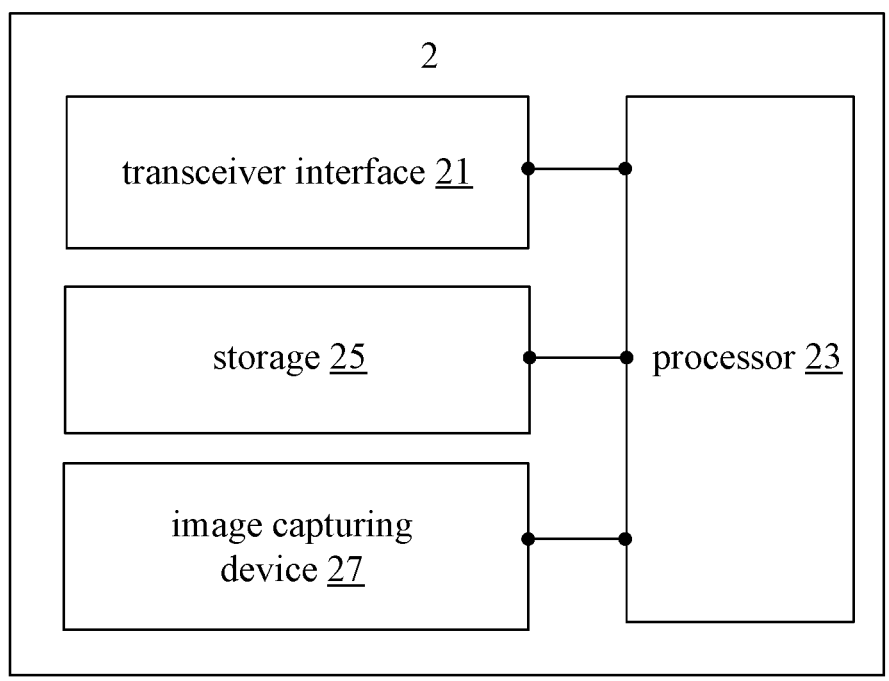
FIG. 2 is a schematic diagram depicting the head-mounted display of some embodiments.

In the present embodiment, a schematic diagram of the structure of the head-mounted display 2 is depicted in FIG. 2. The head-mounted display 2 comprises a transceiver interface 21, a processor 23, and a storage 25. The processor 23 is coupled to the transceiver interface 21 and the storage 25.

In some embodiments, as shown in FIG. 2, the head-mounted display 2 may further comprise an image capturing device 27, and the image capturing device 27 is coupled to the processor 23. The image capturing device 27 may comprise a plurality of image capturing units (e.g., a plurality of depth camera lenses) for capturing a plurality of real-time images corresponding to a field of view (FOV), and the body part (e.g., at least one finger position) of the user C wearing the wearable device 3 is included in the field of view.

Figure 3:
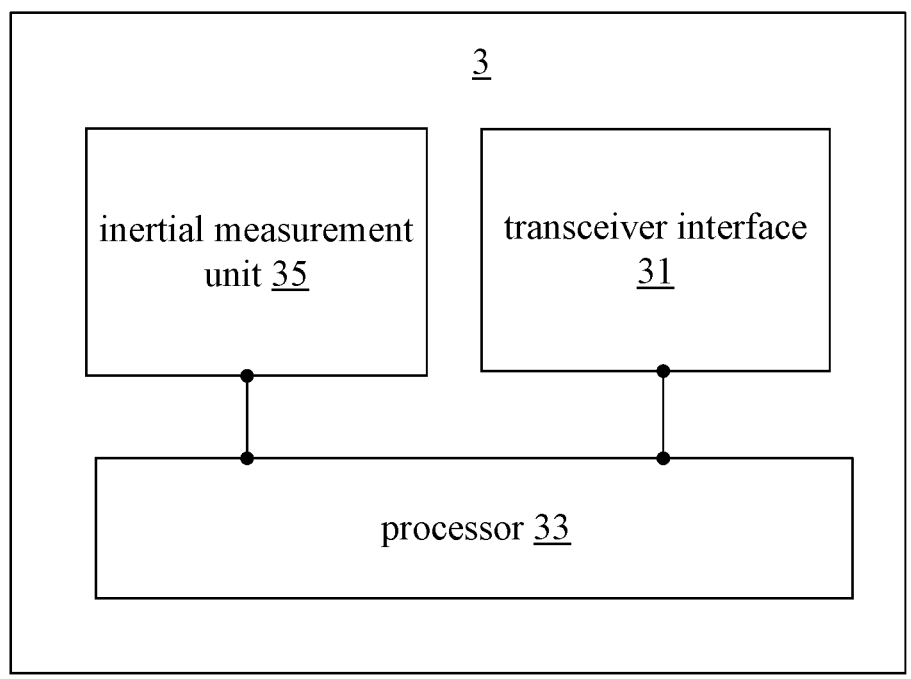
FIG. 3 is a schematic diagram depicting the wearable device of some embodiments.

In addition, in the present embodiment, a schematic diagram of the structure of the wearable device 3 is depicted in FIG. 3. The wearable device 3 comprises a transceiver interface 31, a processor 33, and an inertial measurement unit 35. The processor 33 is coupled to the transceiver interface 31 and the inertial measurement unit 35. The inertial measurement unit 35 is configured to detect the inertial measurement parameters corresponding to the body part (e.g., at least one finger position) of the user C wearing the wearable device 3.

Specifically, the inertial measurement unit may continuously generate a series of inertial measurement parameters (e.g., a stream of inertial measurement parameters generated at a frequency of 10 times per second), and each of the inertial measurement parameters may comprises an acceleration, an amount of rotation, and an angular acceleration. During operation, the head-mounted display 2 may periodically receive the inertial measurement parameters from the wearable device 3.

It shall be appreciated that the inertial measurement parameters generated by the wearable device 3 may correspond to the body parts of the user C (e.g., the body part of the finger). For example, the user C may wear the wearable device 3 on any finger to collect data. For convenience of description, in the present embodiment, the user C may wear two wearable devices 3 on the index finger and the ring finger.

It shall be appreciated that the transceiver interface 21 and the transceiver interface 31 is an interface capable of receiving and transmitting data or other interfaces capable of receiving and transmitting data and known to those of ordinary skill in the art. The transceiver interface can receive data from sources such as external apparatuses, external web pages, external applications, and so on. The processor 23 and the processor 33 may be any of various processors, Central Processing Units (CPUs), microprocessors, digital signal processors or other computing apparatuses known to those of ordinary skill in the art. The storage 25 may be a memory, a Universal Serial Bus (USB) disk, a hard disk, a Compact Disk (CD), a mobile disk, or any other storage medium or circuit known to those of ordinary skill in the art and having the same functionality.

It shall be appreciated that FIG. 1 is merely an example for illustration, and the present disclosure does not limit the content of the unlocking signal generating system 1. For example, the present disclosure does not limit the number of wearable devices 3 connected to the head-mounted display 2. The head-mounted display 2 may be connected to a plurality of wearable devices through the network at the same time, depending on the scale and actual requirements of the unlocking signal generating system 1.

In the present embodiment, the processor 23 of the head-mounted display 2 generates a wearing position distribution based on a plurality of real-time images, and the wearing position distribution indicates a wearing position of the at least one wearable device 3 worn by the user C.

Specifically, the wearing position distribution may be generated by the following operations. First, the processor 23 determines a plurality of finger joint (i.e., knuckle) positions of the user based on the real-time images. Next, the processor 23 determines a wearing status of each of the at least one finger position based on the finger joint positions to generate a plurality of finger position boolean values corresponding to the at least one finger position. Finally, the processor 23 generates the wearing position distribution based on the finger position boolean values.

Figure 4:
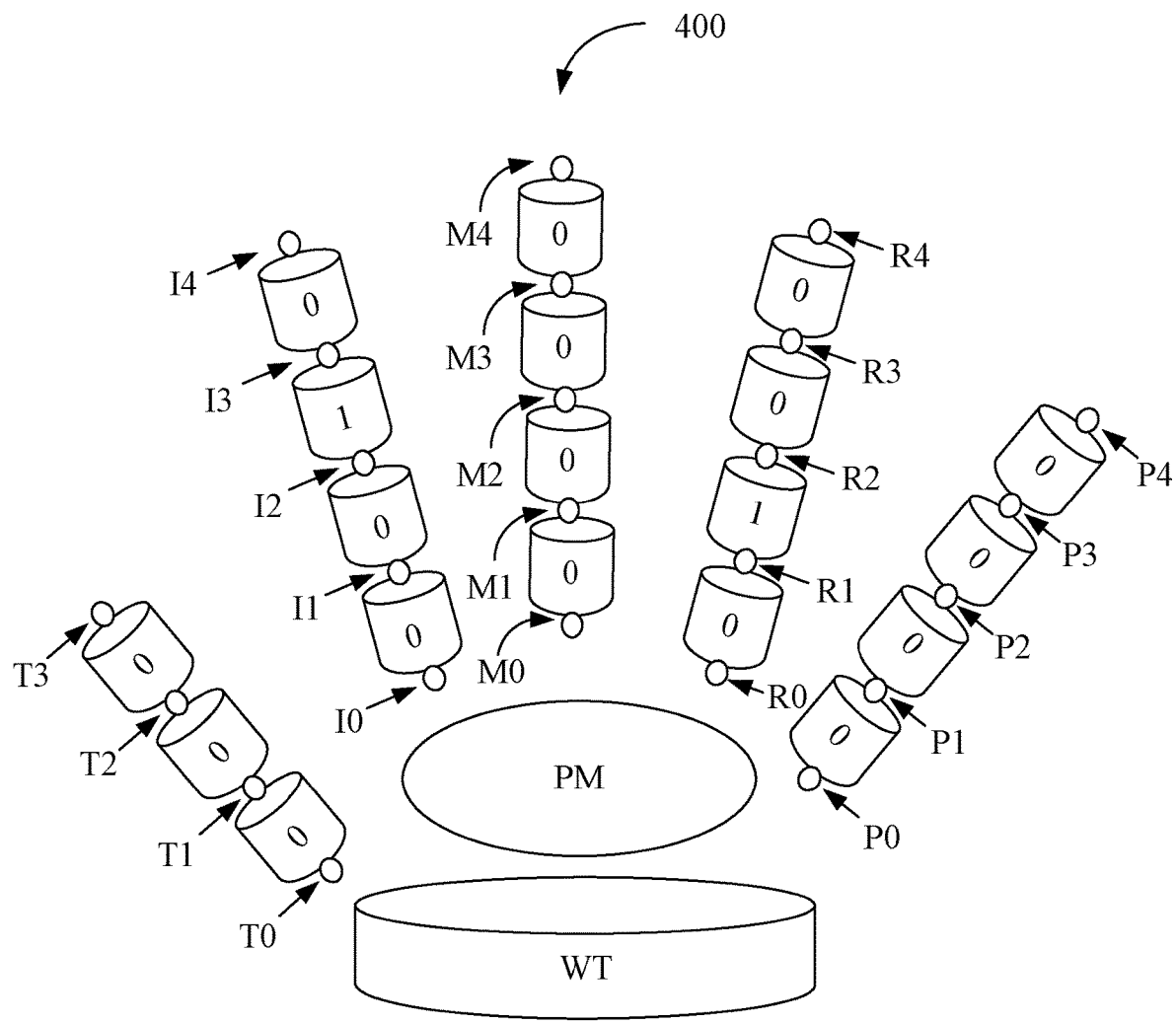
FIG. 4 is a schematic diagram depicting the finger joint positions of some embodiments.

For ease of understanding, please refer to the finger joint positions schematic diagram 400 in FIG. 4. As shown in FIG. 4, the finger joint positions schematic diagram 400 illustrates each of the finger joint positions of the user C, including the fingers connected to the palm PM and the wrist WT, such as thumb joints T0, T1, T2, and T3, index finger joints I0, I1, I2, I3 and I4, middle finger joints M0, M1, M2, M3, and M4, ring finger joints R0, R1, R2, R3, and R4, pinky joints P0, P1, P2, P3, and P4.

In the present example, the processor 23 can determine a plurality of finger joint positions of the user. Next, the processor 23 determine the wearing status of each of the at least one finger position by analyzing the finger joint positions. When the processor 23 determines that there is a wearable device 3 between the finger joint positions, the boolean value of the finger position corresponding to the joint position is set as 1. When the processor 23 determines that there is no wearable device 3 between the finger joint positions, the boolean value of the finger position corresponding to the joint position is set to 0. In the present example, as shown in FIG. 4, the processor 23 determines that the user C wears the wearable device 3 between the index finger joint I3 and the index finger joint I2, and therefore the processor 23 sets the finger position boolean value corresponding to the finger position (i.e., the second section of the index finger) to 1. In addition, the processor 23 further determines that the user C wears another wearable device 3 between the ring finger joint R2 and the ring finger joint R1, and therefore the processor 23 sets the finger position boolean value corresponding to the finger position to 1 (i.e., the second section of the ring finger).

It shall be appreciated that, the head-mounted display 2 may perform the calculation and analysis of the finger joint positions of the user C through the analysis technology of the human skeleton shape and torque in biomechanics. For example, the head-mounted display 2 may determine the angle and the finger joint position of the finger skeleton of the user C through the posture detection algorithm.

Next, in the present embodiment, the processor 23 generates an unlock signal to unlock the head-mounted display 2 based on the wearing position distribution.

In some embodiments, the wearing position distribution can be presented through different implementations. For example, the processor 23 can generate a code sequence corresponding to the hand based on the finger position boolean values, the code sequence can represent the wearing position distribution with a fixed-length code, and the processor 23 can quickly determine whether to generate the unlock signal based on the code sequence. Taking FIG. 4 as an example, the code sequence can be "000010000000100000" (i.e., the code sequence consists of the wearing statuses of thumb "000", index finger "0100", middle finger "0000", ring finger "0010", and pinky "0000").

In some embodiments, the operation of generating the unlocking signal comprises the following operations. First, the processor 23 compares whether the wearing position distribution conforms to a preset unlocking pattern, and the preset unlocking pattern indicates an unlocking position distribution of the at least one wearable device 3. Next, the processor 23 generates the unlocking signal to unlock the head-mounted display 2 in response to the wearing position distribution conforming to the preset unlocking pattern.

For example, the preset unlocking pattern may indicate that the unlocking positions corresponding to the unlocking position distribution are the second section of the index finger and the second section of the ring finger (i.e., when the user C wears the wearable devices on the second section of the index finger and the second section of the ring finger, it may correspond to the unlocking condition). In the present example, the processor 23 compares whether the wearing position distribution of the at least one wearable device 3 matches the second section of the index finger and the second section of the ring finger. If the matching result is yes, the processor 23 generates the unlocking signal to unlock the head-mounted display 2.

In some embodiments, the matching result determined by the processor 23 may be a complete match. In some embodiments, the matching result determined by the processor 23 may be a partial match (e.g., greater than a degree of matching). In some embodiments, the matching result determined by the processor 23 may be a complete match or a partial match.

In some embodiments, the head-mounted display 2 can store a plurality of preset unlocking configurations (e.g., the positional relationship between fingers), and each of these preset unlocking configurations corresponds to a wearing position distribution. For example, one of the preset unlocking configurations can be set as that when the finger positions of two wearable devices 3 are adjacent, the positional relationship meets the unlocking condition.

In some embodiments, before performing the operation of generating the wearing position distribution, in addition to verifying the positional relationship of the device worn on the hand, the processor 23 will further verify whether the wearable device has a pairing relationship with the head-mounted display 2 to make subsequent verification and determination more accurately.

Specifically, the processor 23 may receive a pairing request from the at least one wearable device 3. Next, the processor 23 establishes a communication connection with the at least one wearable device 3 in response to the pairing request.

In some embodiments, the head-mounted display 2 further verifies whether the number of the at least one wearable device 3 worn by the user C matches the number of the wearable devices paired with the head-mounted display 2 (i.e., the unlock signal is generated only when the processor 23 determines that the numbers are equal). Specifically, the processor 23 calculates a pairing quantity of the at least one wearable device 3 having the communication connection with the head-mounted display 2. Next, the processor 23 compares a wearing quantity corresponding to the wearing position distribution with the pairing quantity to generate the unlocking signal to unlock the head-mounted display 2.

In some implementations, in order to save computing resources and reduce the occurrence of misjudgments, the head-mounted display 2 only activates the processor 23 to determine the unlocking operation when the user C performs some unlocking movements.

Specifically, before performing the operation of generating the wearing position distribution, the processor 23 determines whether a first hand movement of the user C corresponds to a first unlocking movement of a plurality of unlocking movements to generate the wearing position distribution.

If the user C makes a preset unlocking movement (e.g., the first unlocking movement), the processor 23 generates the wearing position distribution based on the real-time images in response to determining that the first hand movement of the user corresponds to the first unlocking movement. If the user C does not make a preset unlocking movement, the processor 23 does not generate the wearing position distribution in response to determining that the first hand movement of the user C does not correspond to the unlocking movements.

In some embodiments, in order to more accurately determine whether the movement of the user C corresponds to the unlocking movement, the head-mounted display 2 will further determine whether the movement of the user C corresponds to the unlocking movement through the inertial measurement parameters.

Specifically, the processor 23 receives the inertial measurement parameters from the at least one wearable device 3. Next, the processor 23 determines whether the first hand movement of the user C corresponds to the first unlocking movement of the unlocking movements based on the inertial measurement parameters.

In some embodiments, the head-mounted display 2 may perform the calculation and analysis of the finger positions of the user C through the analysis technology of the human skeleton shape and torque in biomechanics. For example, the processor 23 may determine the angle and position of the finger skeleton of the user C through the posture detection algorithm. When the user C's finger skeleton reaches a predetermined angle and position, it is determined that the user C has acted a corresponding movement.

It shall be appreciated that the processor 23 can analyze the first hand movement of the user C through the trained convolutional neural network. For example, taking the body parts as fingers as an example, the trained convolutional neural network can be a gesture classifier. Specifically, the convolutional neural network can be used to analyze the inertial measurement parameters and generate gestures/movements corresponding to the inertial measurement parameters. In some embodiments, the convolutional neural network can be trained with labeled inertial measurement data (e.g., the inertial measurement parameters corresponding to the fingers).

In some embodiments, the head-mounted display 2 may further determine a wearing status of each of the at least one finger position based on the inertial measurement parameters, so as to generate the wearing position distribution more accurately.

Specifically, the processor 23 calculates a plurality of first rotation values corresponding to a second hand movement of the user C based on the real-time images, and each of the first rotation values corresponds to one of the at least one finger position. Next, the processor 23 calculates a plurality of second rotation values of the at least one wearable device based on the inertial measurement parameters, and each of the second rotation values corresponds to one of the at least one wearable device (i.e., each wearable device corresponds to a second rotation value).

Next, the processor 23 compares the first rotation values with the second rotation values to determine a wearing status of each of the at least one finger position. Finally, the processor 23 determines the wearing position distribution based on the wearing status.

In some embodiments, the head-mounted display 2 further executes an application program, and the unlock signal generated by the processor 23 can be used to unlock the application program.

According to the above descriptions, the unlocking signal generating system 1 provided by the present disclosure by analyzing a plurality of real-time images corresponding to the at least one finger position of the user to generate a wearing position distribution. Next, the present disclosure can generate an unlock signal to unlock the head-mounted display based on the wearing position distribution. Since the present disclosure only requires the cooperation of the wearable device and the head-mounted display, the user does not need to hold the controller or operate physical buttons on the controller, and does not need to draw complicated unlocking patterns. Therefore, the unlocking signal generating system 1 provided by the present disclosure can improve the efficiency of unlocking the head-mounted display when the user wears the head-mounted display.

Figure 5:
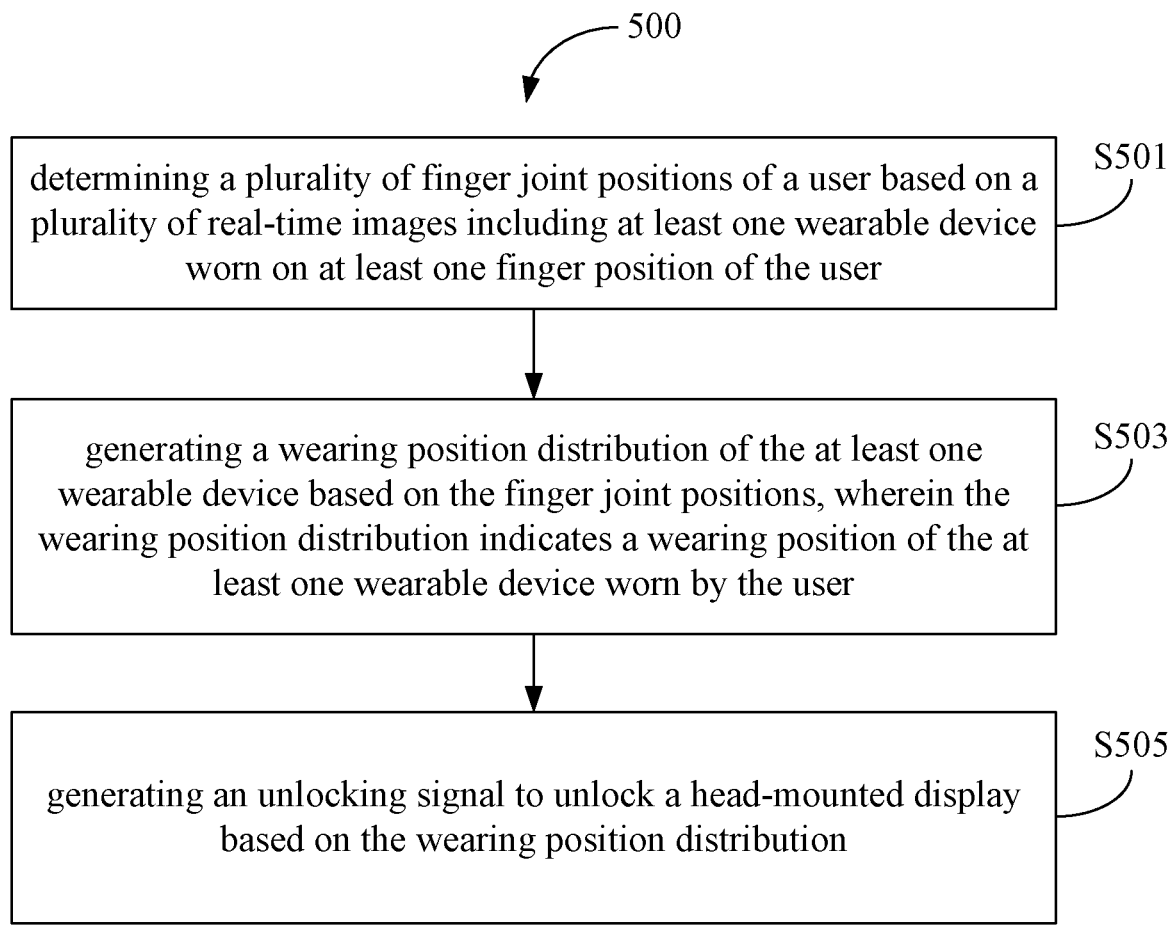
FIG. 5 is a partial flowchart depicting the unlocking method of the second embodiment.

A second embodiment of the present disclosure is an unlocking method and a flowchart thereof is depicted in FIG. 5. The unlocking method 500 is adapted for an electronic apparatus (e.g., the head-mounted display 2 in the unlocking signal generating system 1 described in the first embodiment). The unlocking method 500 generates an unlocking signal to unlock the device (e.g., the head-mounted display) through the steps S501 to S505.

In the step S501, the electronic apparatus determines a plurality of finger joint positions of a user based on the real-time images including at least one wearable device worn on at least one finger position of the user. Next, in the step S503, the electronic apparatus generates a wearing position distribution of the at least one wearable device based on the finger joint positions, wherein the wearing position distribution indicates a wearing position of the at least one wearable device worn by the user.

Finally, in the step S505, the electronic apparatus generates an unlocking signal to unlock the head-mounted display based on the wearing position distribution.

In some embodiments, wherein the step of generating the wearing position distribution comprises the following steps: determining a wearing status of each of the at least one finger position based on the finger joint positions to generate a plurality of finger position boolean values corresponding to the at least one finger position; and generating the wearing position distribution based on the finger position boolean values.

In some embodiments, wherein the step of generating the unlocking signal comprises the following steps: comparing whether the wearing position distribution conforms to a preset unlocking pattern, wherein the preset unlocking pattern indicates an unlocking position distribution of the at least one wearable device; and generating the unlocking signal to unlock the head-mounted display in response to the wearing position distribution conforming to the preset unlocking pattern.

In some embodiments, the unlocking method 500 further comprises the following steps: receiving a pairing request; and establishing a communication connection with the at least one wearable device in response to the pairing request.

In some embodiments, the unlocking method 500 further comprises the following steps: calculating a pairing quantity of the at least one wearable device having the communication connection with the head-mounted display; and comparing a wearing quantity corresponding to the wearing position distribution with the pairing quantity to generate the unlocking signal to unlock the head-mounted display.

In some embodiments, wherein the at least one wearable device further comprises an inertial measurement unit, and the inertial measurement unit is configured to detect a plurality of inertial measurement parameters corresponding to the at least one finger position of the user.

In some embodiments, before performing the step of generating the wearing position distribution, the unlocking method 500 is further comprises the following steps: receiving the inertial measurement parameters from the at least one wearable device; and determining whether a first hand movement of the user corresponds to a first unlocking movement of a plurality of unlocking movements based on the inertial measurement parameters to generate the wearing position distribution.

In some embodiments, the unlocking method 500 further comprises following steps: generating the wearing position distribution based on the real-time images in response to determining that the first hand movement of the user corresponds to the first unlocking movement, wherein in response to determining that the first hand movement of the user does not correspond to the unlocking movements, the wearing position distribution is not generated.

In some embodiments, the step of generating the wearing position distribution comprises the following steps: calculating a plurality of first rotation values corresponding to a second hand movement of the user based on the real-time images, wherein each of the first rotation values corresponds to one of the at least one finger position; calculating a plurality of second rotation values of the at least one wearable device based on the inertial measurement parameters, wherein each of the second rotation values corresponds to one of the at least one wearable device; comparing the first rotation values with the second rotation values to determine a wearing status of each of the at least one finger position; and determining the wearing position distribution based on the wearing status.

In addition to the aforesaid steps, the second embodiment can also execute all the operations and steps of the unlocking signal generating system 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The unlocking method described in the second embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the head-mounted display 2), the computer program executes the unlocking method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that in the specification and the claims of the present disclosure, some words (e.g., hand movement, unlocking movement, and rotation value, etc.) are preceded by terms such as "first" or "second", and these terms of "first" or "second" are only used to distinguish these different words. For example, the "first" and "second" rotation values are only used to indicate the different rotation values used in different operations.

According to the above descriptions, the unlocking technology (at least including the head-mounted display, the method, and the non-transitory computer readable storage medium) provided by the present disclosure by analyzing a plurality of real-time images corresponding to the at least one finger position of the user to generate a wearing position distribution. Next, the present disclosure can generate an unlock signal to unlock the head-mounted display based on the wearing position distribution. Since the present disclosure only requires the cooperation of the wearable device and the head-mounted display, the user does not need to hold the controller or operate physical buttons on the controller, and does not need to draw complicated unlocking patterns. Therefore, the unlocking technology provided by the present disclosure can improve the efficiency of unlocking the head-mounted display when the user wears the head-mounted display.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A head-mounted display, comprising:
   an image capturing device, configured to capture a plurality of real-time images including at least one wearable device worn on at least one finger position of a user; and
   a processor, coupled to the image capturing device, configured to:
   generate a wearing position distribution based on the real-time images, wherein the wearing position distribution indicates a wearing position of the at least one wearable device worn by the user;
   receive a pairing request;
   establish a communication connection with the at least one wearable device in response to the pairing request;
   calculate a pairing quantity of the at least one wearable device having the communication connection with the head-mounted display; and
   compare a wearing quantity corresponding to the wearing position distribution with the pairing quantity to generate an unlocking signal to unlock the head-mounted display based on the wearing position distribution.

2. The head-mounted display of claim 1, wherein the operation of generating the wearing position distribution comprises the following operations:
   determining a plurality of finger joint positions of the user based on the real-time images;
   determining a wearing status of each of the at least one finger position based on the finger joint positions to generate a plurality of finger position boolean values corresponding to the at least one finger position; and
   generating the wearing position distribution based on the finger position boolean values.

3. The head-mounted display of claim 1, wherein the operation of generating the unlocking signal comprises the following operations:
   comparing whether the wearing position distribution conforms to a preset unlocking pattern, wherein the preset unlocking pattern indicates an unlocking position distribution of the at least one wearable device; and
   generating the unlocking signal to unlock the head-mounted display in response to the wearing position distribution conforming to the preset unlocking pattern.

4. The head-mounted display of claim 1, wherein the at least one wearable device further comprises:
   an inertial measurement unit, being configured to detect a plurality of inertial measurement parameters corresponding to the at least one finger position of the user.

5. The head-mounted display of claim 4, wherein, before performing the operation of generating the wearing position distribution, the processor is further configured to perform the following operations:
   determining whether a first hand movement of the user corresponds to a first unlocking movement of a plurality of unlocking movements to generate the wearing position distribution.

6. The head-mounted display of claim 5, wherein the processor is further configured to perform the following operations:

generating the wearing position distribution based on the real-time images in response to determining that the first hand movement of the user corresponds to the first unlocking movement,
wherein in response to determining that the first hand movement of the user does not correspond to the unlocking movements, the wearing position distribution is not generated.

7. The head-mounted display of claim 5, wherein the processor is further configured to perform the following operations:
receiving the inertial measurement parameters from the at least one wearable device; and
determining whether the first hand movement of the user corresponds to the first unlocking movement of the unlocking movements based on the inertial measurement parameters.

8. The head-mounted display of claim 4, wherein the operation of generating the wearing position distribution comprises the following operations:
calculating a plurality of first rotation values corresponding to a second hand movement of the user based on the real-time images, wherein each of the first rotation values corresponds to one of the at least one finger position;
calculating a plurality of second rotation values of the at least one wearable device based on the inertial measurement parameters, wherein each of the second rotation values corresponds to one of the at least one wearable device;
comparing the first rotation values with the second rotation values to determine a wearing status of each of the at least one finger position; and
determining the wearing position distribution based on the wearing status.

9. An unlocking method, being adapted for use in an electronic apparatus, wherein the unlocking method comprises:
determining a plurality of finger joint positions of a user based on a plurality of real-time images including at least one wearable device worn on at least one finger position of the user;
generating a wearing position distribution of the at least one wearable device based on the finger joint positions, wherein the wearing position distribution indicates a wearing position of the at least one wearable device worn by the user;
receiving a pairing request;
establishing a communication connection with the at least one wearable device in response to the pairing request;
calculating a pairing quantity of the at least one wearable device having the communication connection with a head-mounted display; and
comparing a wearing quantity corresponding to the wearing position distribution with the pairing quantity to generate an unlocking signal to unlock the head-mounted display based on the wearing position distribution.

10. The unlocking method of claim 9, wherein the step of generating the wearing position distribution comprises the following steps:
determining a wearing status of each of the at least one finger position based on the finger joint positions to generate a plurality of finger position boolean values corresponding to the at least one finger position; and
generating the wearing position distribution based on the finger position boolean values.

11. The unlocking method of claim 9, wherein the step of generating the unlocking signal comprises the following steps:
comparing whether the wearing position distribution conforms to a preset unlocking pattern, wherein the preset unlocking pattern indicates an unlocking position distribution of the at least one wearable device; and
generating the unlocking signal to unlock the head-mounted display in response to the wearing position distribution conforming to the preset unlocking pattern.

12. The unlocking method of claim 9, wherein the at least one wearable device further comprises:
an inertial measurement unit, being configured to detect a plurality of inertial measurement parameters corresponding to the at least one finger position of the user.

13. The unlocking method of claim 12, wherein, before performing the step of generating the wearing position distribution, the unlocking method is further comprises the following steps:
receiving the inertial measurement parameters from the at least one wearable device; and
determining, based on the inertial measurement parameters, whether a first hand movement of the user corresponds to a first unlocking movement of a plurality of unlocking movements to generate the wearing position distribution.

14. The unlocking method of claim 13, wherein the unlocking method further comprises the following steps:
generating the wearing position distribution based on the real-time images in response to determining that the first hand movement of the user corresponds to the first unlocking movement,
wherein in response to determining that the first hand movement of the user does not correspond to the unlocking movements, the wearing position distribution is not generated.

15. The unlocking method of claim 12, wherein the step of generating the wearing position distribution comprises the following steps:
calculating a plurality of first rotation values corresponding to a second hand movement of the user based on the real-time images, wherein each of the first rotation values corresponds to one of the at least one finger position;
calculating a plurality of second rotation values of the at least one wearable device based on the inertial measurement parameters, wherein each of the second rotation values corresponds to one of the at least one wearable device;
comparing the first rotation values with the second rotation values to determine a wearing status of each of the at least one finger position; and
determining the wearing position distribution based on the wearing status.

16. A non-transitory computer readable storage medium, having a computer program stored therein, wherein the computer program comprises a plurality of codes, the computer program executes an unlocking method after being loaded into an electronic apparatus, the unlocking method comprises:
determining a plurality of finger joint positions of a user based on a plurality of real-time images including at least one wearable device worn on at least one finger position of the user;
generating a wearing position distribution of the at least one wearable device based on the finger joint positions, wherein the wearing position distribution indicates a wearing position of the at least one wearable device worn by the user;

receiving a pairing request;

establishing a communication connection with the at least one wearable device in response to the pairing request;

calculating a pairing quantity of the at least one wearable device having the communication connection with a head-mounted display; and comparing a wearing quantity corresponding to the wearing position distribution with the pairing quantity to generate an unlocking signal to unlock the head-mounted display based on the wearing position distribution.

* * * * *